United States Patent
Tabuchi et al.

(10) Patent No.: US 6,860,639 B2
(45) Date of Patent: Mar. 1, 2005

(54) ROTATOR WITH BEARING, AND METHOD FOR MANUFACTURING THE SAME

(75) Inventors: Yasuo Tabuchi, Toyoake (JP); Akira Kishibuchi, Nagoya (JP)

(73) Assignee: Denso Corporation, Kariya (JP)

( * ) Notice: Subject to any disclaimer, the term of this patent is extended or adjusted under 35 U.S.C. 154(b) by 165 days.

(21) Appl. No.: 10/342,309

(22) Filed: Jan. 15, 2003

(65) Prior Publication Data

US 2003/0132677 A1 Jul. 17, 2003

(30) Foreign Application Priority Data

Jan. 15, 2002 (JP) ........................................ 2002-005839

(51) Int. Cl.[7] .......................... F16C 33/58; F16C 37/00
(52) U.S. Cl. ...................... 384/513; 384/546; 384/537; 384/476; 474/70; 474/199
(58) Field of Search ................................ 384/513, 546, 384/547, 537, 445, 449, 456, 476; 474/70, 199

(56) References Cited

U.S. PATENT DOCUMENTS

| | | | | |
|---|---|---|---|---|
| 4,602,875 A | * | 7/1986 | Doerr et al. | 384/547 |
| 4,848,938 A | * | 7/1989 | Haas et al. | 384/536 |
| 4,925,322 A | * | 5/1990 | Hishida | 384/486 |
| 5,725,448 A | * | 3/1998 | Kato et al. | 474/199 |
| 6,142,675 A | * | 11/2000 | Brandenstein et al. | 384/537 |
| 6,482,140 B1 | * | 11/2002 | Takatsu | 384/449 |

FOREIGN PATENT DOCUMENTS

| | | |
|---|---|---|
| JP | A-5-248514 | 9/1993 |
| JP | A-5-248515 | 9/1993 |
| JP | A-2001-227620 | 8/2001 |
| JP | A-2001-317616 | 11/2001 |
| JP | A-2002-147578 | 5/2002 |

* cited by examiner

*Primary Examiner*—Thomas R. Hannon
(74) *Attorney, Agent, or Firm*—Posz & Bethards, PLC

(57) ABSTRACT

A pulley includes a radial rolling bearing and a pulley main body which are integrated to each other by an insert molding method. Therefore, a metal insert member is not required between the resin pulley main body and the radial rolling bearing, thereby reducing production cost of the pulley. Further, an axial dimension of an outer ring of the radial rolling bearing is set larger than an axial dimension of an inner ring thereof, so that a contact area between the radial rolling bearing and the pulley main body is increased. Therefore, a connection strength between the radial rolling bearing and the pulley main body is increased, and a surface area of the radial rolling bearing is increased, thereby improving heat radiation performance of the radial rolling bearing.

11 Claims, 6 Drawing Sheets

ROTATOR WITH BEARING, AND METHOD FOR MANUFACTURING THE SAME

CROSS-REFERENCE TO RELATED APPLICATION

This application is related to and claims priority from Japanese Patent Application No. 2002-5839 filed on Jan. 15, 2002, the content of which is hereby incorporated by reference.

BACKGROUND OF THE INVENTION

1. Field of the Invention

The present invention relates to a rotator including a bearing, which is suitably used for a pulley for transmitting power. Further, the present invention relates to a method for manufacturing the rotator.

2. Description of Related Art

In a conventional pulley for transmitting motive power disclosed in JP-A-2001-227620, a generally cylindrical metal member is integrated with a resinous pulley main body by using an insert molding method. However, since a bearing is press-fitted to an inner peripheral surface of the metal member, the inner peripheral surface requires finishing operation such as cutting. Therefore, it is difficult to reduce the number of working steps of the pulley and the number of components thereof.

SUMMARY OF THE INVENTION

In view of the above problem, it is an object of the present invention to reduce production cost of a rotator such as a pulley.

It is an another object of the present invention to provide a rotator that is manufactured in low cost, while a bonding strength between a rotating member and a bearing is increased.

According to the present invention, a rotator includes a rotating member made of resin, and a bearing attached to a radial inner side of the rotating member. The bearing includes an outer ring integrated to the rotating member by an insert molding, an inner ring positioned at a radial inside of the outer ring, and a bearing ball that is disposed to rolling-contact an inner peripheral surface of the outer ring and an outer peripheral surface of the inner ring. In the rotator, the outer ring has an axial dimension larger than an axial dimension of the inner ring in an axial direction of the rotating member. Because the bearing and the rotating member are integrated to each other through the insert molding, a metal insert member is not required to be disposed between the rotating member and the bearing, thereby reducing production cost of the rotator. In addition, because the outer ring has the axial dimension larger than the axial dimension of the inner ring, a bonding area between the bearing and the rotating member can be increased, and a connection strength therebetween can be increased while an outer surface of the bearing can be increased. Accordingly, heat radiation performance of the bearing can be improved.

Preferably, the outer ring has an outer peripheral surface contacting the rotating member, and the outer peripheral surface has an uneven portion. Therefore, the outer ring of the bearing can be engaged with the rotating member in the insert molding, and the connection strength between the bearing and the rotating member can be effectively increased.

Preferably, the rotating member includes two projections protruding to a radial inside of the outer peripheral surface of the outer ring, and the two projections contact two axial ends of the outer ring to pinch the outer ring from the two axial ends. Therefore, the bearing is fixed by the projections of the rotating member in the axial direction, and connection strength between the bearing and the rotating member can be further improved. On the other hand, the outer ring has the outer peripheral surface, two axial ends and two chamfer surfaces connecting the outer peripheral surface and the axial ends. In this case, the rotating member contacts the outer peripheral surface and the chamfer surfaces of the outer ring.

Further, the outer ring of the bearing includes a heat radiation portion exposed to atmospheric air, from which heat is radiated to atmospheric air. The heat radiation portion has a heat-radiation facilitating portion for facilitating heat radiation, and the heat-radiation facilitating portion is provided to increase a heat radiation area of the heat radiation portion. For example, the heat-radiation facilitating portion is a plurality of recesses provided on an inner peripheral surface of the heat radiation portion. Alternatively, the heat-radiation facilitating portion is a fin press-fitted to an inner peripheral surface of the heat radiation portion, or an uneven portion provided on an axial end of the heat radiation portion.

The rotator of the present invention is manufactured by the insert molding. In the inserting molding, at least the outer ring of the bearing is arranged in a die at a predetermined position, and a resin is injected in the die to form the rotating member integrated to the outer ring, at a radial outside of the outer ring. When only the outer ring of the bearing is provided in the die in the insert molding, the bearing ball is attached to the outer ring so that the bearing ball rolling-contacts the inner peripheral surface of the outer ring, and the inner ring is attached to the bearing ball at a radial inside of the outer ring so that the bearing ball rolling-contacts the inner ring. Alternatively, all the bearing including the outer and inner rings and the bearing ball can be arranged in the die in the insert molding. Accordingly, the bearing and the rotating member can be readily integrated.

BRIEF DESCRIPTION OF THE DRAWINGS

Additional objects and advantages of the present invention will be more readily apparent from the following detailed description of plural embodiments when taken together with the accompanying drawings, in which.

DETAILED DESCRIPTION OF THE PREFERRED EMBODIMENTS

Preferred embodiments of the present invention will be described hereinafter with reference to the appended drawings.

(First Embodiment)

Figure 1A:
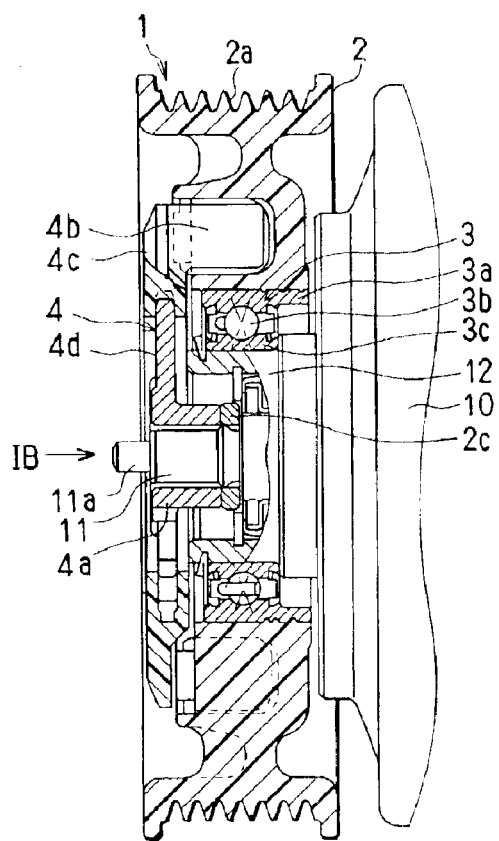
FIG. 1A is a sectional view showing a pulley according to a first embodiment of the present invention.
Figure 1B:
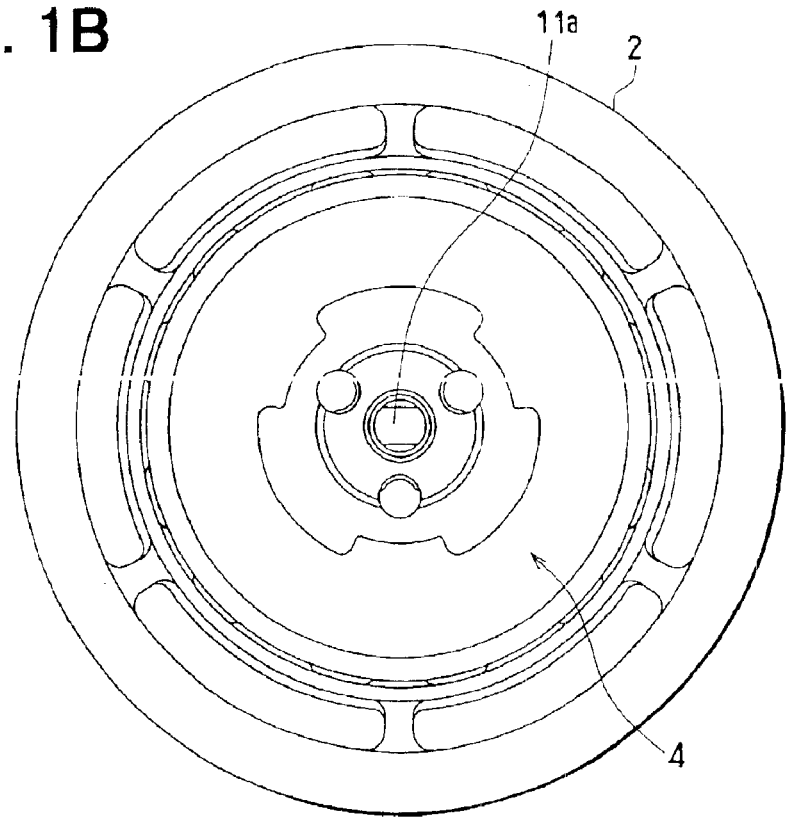
FIG. 1B is a side view taken from the arrow 1B in FIG. 1A.
Figure 2:
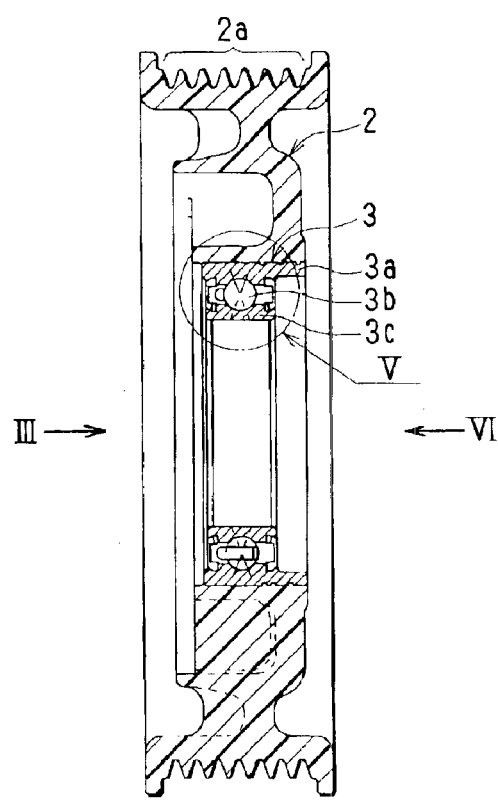
FIG. 2 is a cross-sectional view showing a pulley main body and a radial rolling bearing integrated with the pulley main body, according to the first embodiment.
Figure 3:
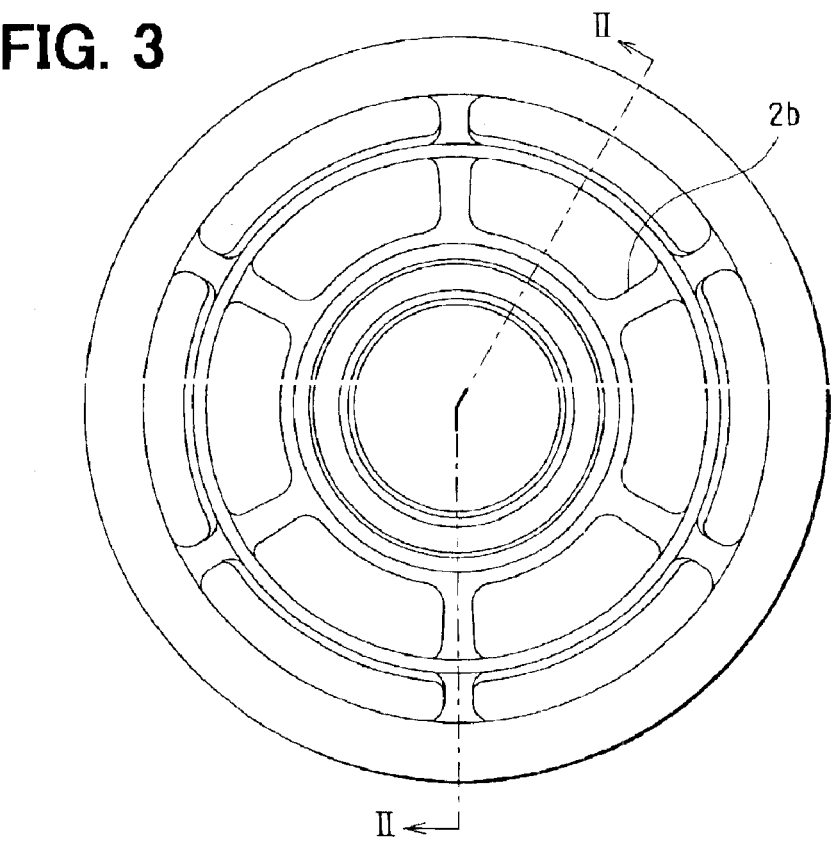
FIG. 3 is a side view taken from the arrow III in FIG. 2.
Figure 4:
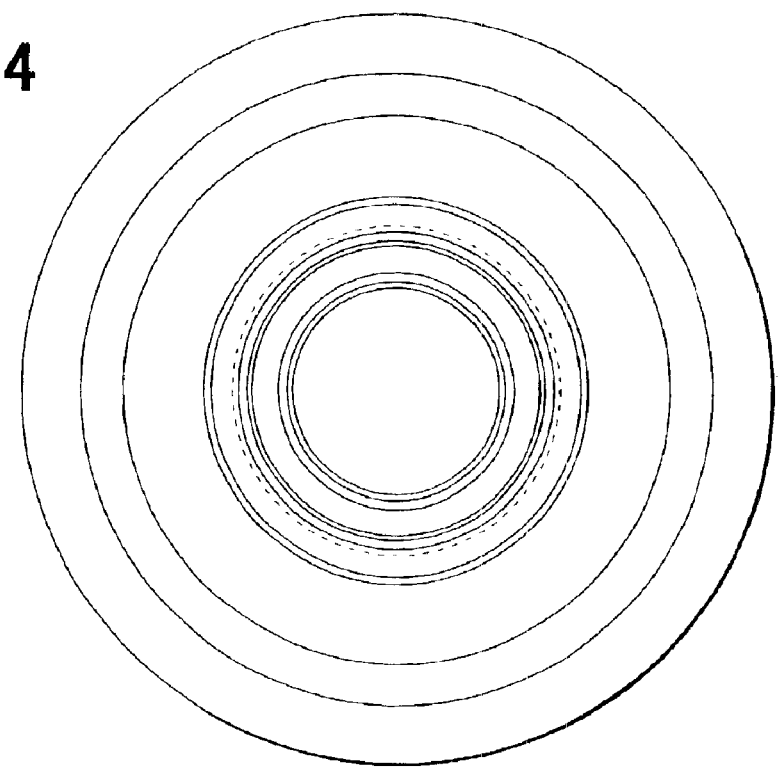
FIG. 4 is a side view taken from the arrow IV in FIG. 2.

In the first embodiment, a rotator of the present invention is typically used for a pulley for transmitting motive power of a vehicle engine to a compressor. As shown in FIGS. 1A, 1B and 2, a pulley 1 includes a pulley main body 2 that is a rotating member made of resin, and a radial rolling bearing 3. Plural rows of V-grooves 2a are formed on an outer peripheral portion of the pulley main body 2, and a pulley drive belt is provided on the plural rows of V-grooves 2a. The radial rolling bearing 3 is attached to a radial inner side of the pulley main body 2. FIG. 3 is a side view when being viewed from the arrow III in FIG. 2, and FIG. 4 is a side view when being viewed from the arrow VI in FIG. 2. Further, FIG. 2 is a cross-sectional view taken along the line II—II in FIG. 3.

Figure 5:
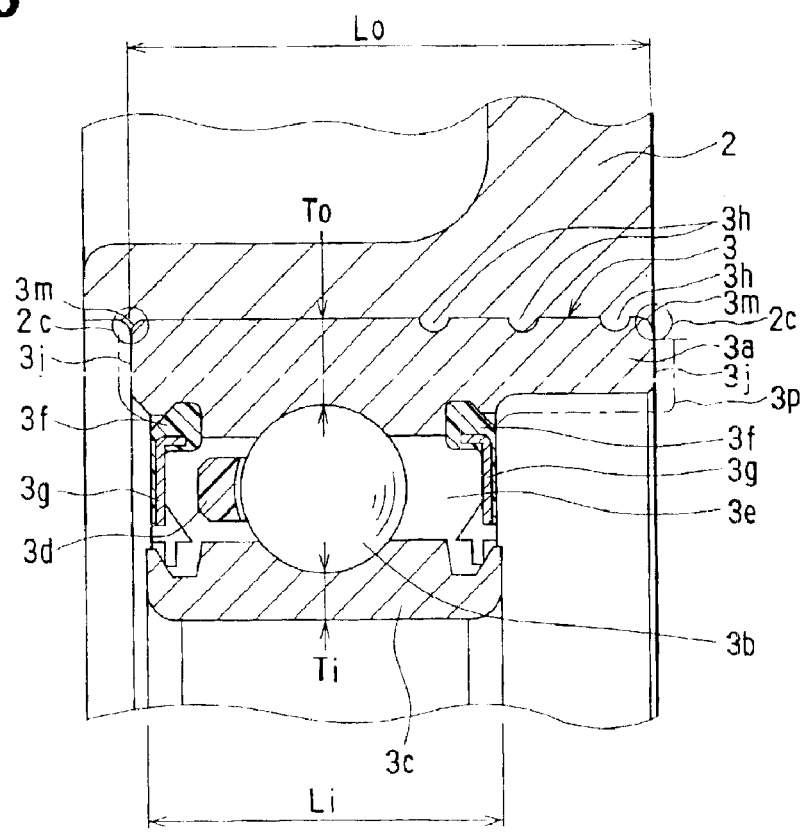
FIG. 5 is an enlarged view showing the V portion in FIG. 2.

As shown in FIG. 5, the radial rolling bearing 3 includes an outer ring 3a integrated to the pulley main body 2, bearing balls 3b, an inner ring 3c disposed radial inside of the outer ring 3a, a retainer 3d for holding the bearing balls 3b, grease contained in a clearance 3e between the outer and inner rings 3a, 3c, a seal member 3f for preventing the grease from flowing out from the clearance 3e and the like. The bearing balls 3b rolling-contact an inner peripheral surface of the outer ring 3a, and an outer peripheral surface of the inner ring 3c. The outer ring 3a, the inner ring 3c and the bearing balls 3b are made of metal such as steel. The retainer 3d is formed from resin such as nylon 66. The seal member 3f is formed from resin such as acrylic rubber, and is reinforced by a metal core 3g immersed in the seal member 3f.

Figure 6A:
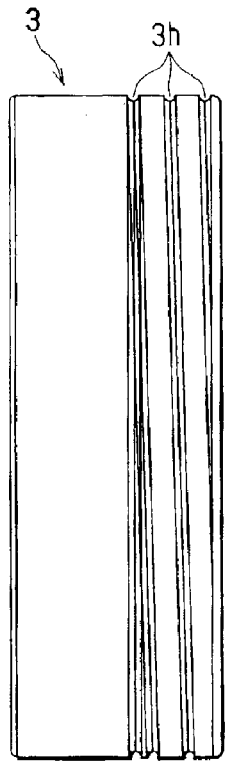
FIG. 6A is a side view showing the radial rolling bearing according to the first embodiment.
Figure 6B:
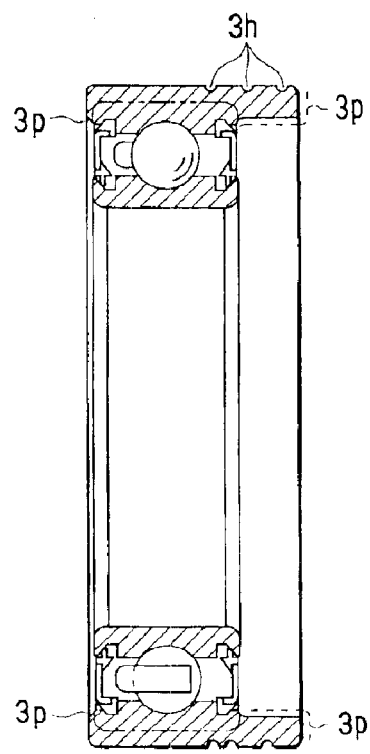
FIG. 6B is a cross-sectional view showing the radial rolling bearing according to the first embodiment.
Figure 7:
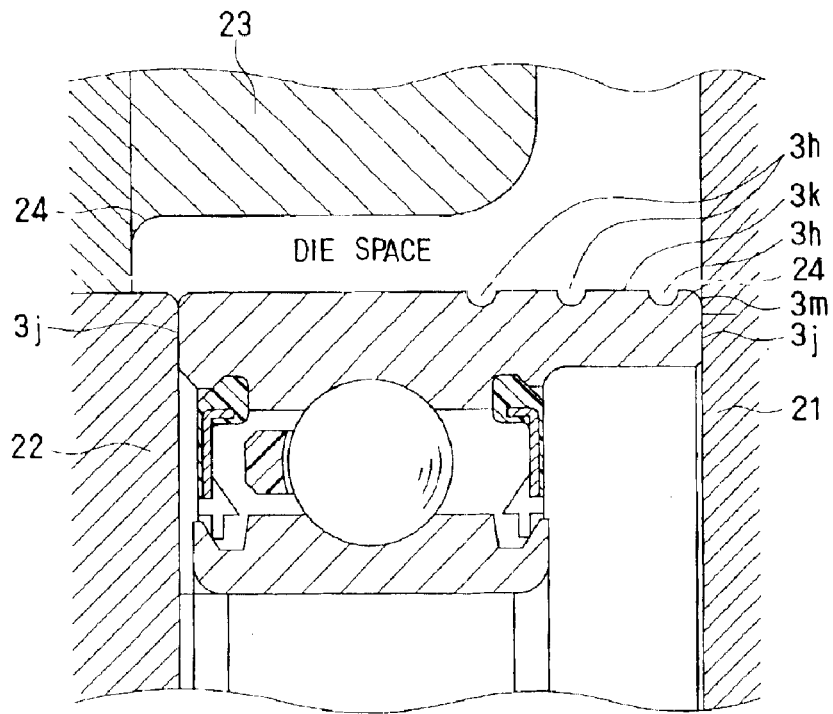
FIG. 7 is an enlarged view showing a portion corresponding to the V portion in FIG. 2 in an insert molding, according to the first embodiment.

An axial dimension Lo of the outer ring 3a is set larger than an axial dimension Li of the inner ring 3c, so that the outer ring 3a extends toward a compressor 10. Further, a wall thickness To of the outer ring 3a is made larger than a wall thickness Ti of the inner ring 3c. Here, the wall thickness To is a minimum wall thickness of the outer ring 3a, that is, a wall thickness of the outer ring 3a at the positions where the bearing ball 3b contacts the outer ring 3a. Further, the wall thickness Ti is a minimum wall thickness of the inner ring 3c, that is, a wall thickness of the inner ring 3c at the positions where the bearing ball 3b contacts the inner ring 3c. As shown in FIGS. 6A, 6B, a spiral recess portion 3h (uneven portion) having plural recesses and protrusions is formed on an outer peripheral surface of the outer ring 3a at the position where the pulley main body 2 contacts the outer ring 3a. As shown in FIG. 1, a front housing of the compressor 10 is press-fitted to the inner peripheral surface of the inner ring 3c. As shown in FIG. 7, the outer ring 3a is provided with an outer peripheral surface 3k, an end surface 3j and a chamfer curved surface 3m connecting the outer peripheral surface 3k and the end surface 3j. As shown in FIG. 5, the pulley main body 2 includes projection portions 2c each having an approximate triangular cross-section. The projection portions 2c of the pulley main body 2 contact the chamfer curved surfaces 3m so as to pinch the outer ring 3a from both the axial ends.

In FIGS. 1A and 1B, a center hub 4 is for transmitting torque transmitted to the pulley main body 2, to a shaft 11 of the compressor. The center hub 4 is connected to the pulley main body 2 to be engaged with each other through a damper that is made of an elastic member such as rubber. The center hub 4 includes a cylindrical portion 4a having a female screw portion, an annular portion 4c provided with a projection portion 4b, and a bridge portion 4d and the like. A male screw portion, formed on an outer peripheral surface of the shaft 11 of the compressor 10, is screw connected to the female screw portion of the cylindrical portion 4a. The projection portion 4b is engaged with a wall-like projection 2b of the pulley main body 2, shown in FIG. 3, through the damper. The bridge portion 4d mechanically connects the annular portion 4c and the cylindrical portion 4a, so that torque from the annular portion 4c is transmitted to the cylindrical portion 4a through the bridge portion 4d. Further, the strength of the bridge portion 4d is set so that the bridge portion 4d fractures when the transmitted torque is larger than a predetermined torque. Here, the bridge portion 4d and the cylindrical portion 4a are integrally formed by sintering of metal powder. Further, the bridge portion 4d is integrated with the annular portion 4c by an insert molding method while the annular portion 4c and the projection portion 4b are molded.

Next, a production method of the pulley 1 will be described with reference to FIG. 7. A melted resin is injected into a die space (cavity) defined by molding dice 21–23 after the radial rolling bearing 3 is disposed at a predetermined position in the die space. At this time, a space 24 is defined between the chamfer curved surfaces 3m and the molding dice 21–23 while the radial rolling bearing 3 is held at the predetermined position by the contact between the molding dice 21, 22 and the end surfaces 3j of the outer ring 3a. Therefore, the projection portions 2c, contacting the chamfer curved surfaces 3m disposed at both the axial ends of the outer ring 3a, are integrated to the pulley main body 2 in the insert molding.

According to the first embodiment, since the radial rolling bearing 3 and the pulley main body 2 are integrated with each other by the insert molding method, it is unnecessary to provide an insert metal member between the resin pulley main body 2 and the radial rolling bearing 3, thereby reducing production cost of the pulley 1. Further, the axial dimension Lo of the outer ring 3a is made larger than the axial dimension Li of the inner ring 3c. Therefore, connection strength (bonding strength) between the radial rolling bearing 3 and the pulley main body 2 can be increased by increasing a contact area therebetween, and a heat radiation can be increased by increasing a surface area of the radial rolling bearing 3. As shown in FIG. 6B, a heat radiation portion 3p is a portion of the outer ring 3a, exposed to atmospheric air.

The spiral recess portion 3h is provided on the outer peripheral surface of the outer ring 3a at the contact portion contacting the pulley main body 2. Therefore, the radial rolling bearing 3 and the pulley main body 2 can be connected and engaged to each other in the insert molding, thereby sufficiently increasing the connection strength therebetween. Further, the wall thickness To of the outer ring 3a is made larger than the wall thickness Ti of the inner ring 3c. Therefore, it can prevent a bearing-ball track surface of the outer ring 3a from being deformed due to molding pressure in the insert molding, and an amount of heat capable of being transmitted to the heat radiation portion 3p can be increased, thereby improving heat radiation performance of the radial rolling bearing 3.

Since the radial rolling bearing 3 is pinched at both the axial ends thereof by the projection portions 2c, the radial rolling bearing 3 is prevented from moving in the axial direction. Therefore, the radial rolling bearing 3 and the pulley main body 2 can be accurately connected to each other. The projection portions 2c are formed by using the chamfer curved surfaces 3m provided at the axial ends of the outer ring 3a, at the time while the pulley main body 2 is molded. Therefore, the projection portions 2c can be formed without adding a particular process. Here, chamfer flat surfaces may be provided in the radial rolling bearing, in place of the chamfer curved surfaces 3m. That is, the shape of the chamfer curved surface 3m can be changed.

(Second Embodiment)

Figure 8A:
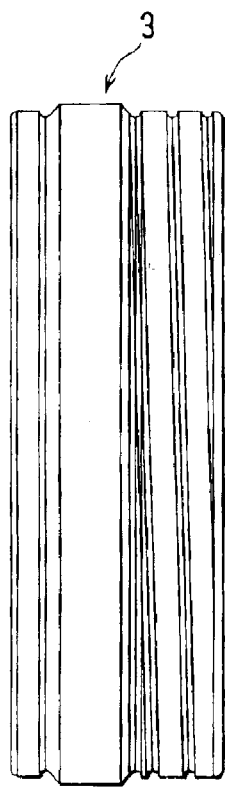
FIG. 8A is a side view showing a radial rolling bearing according to a second embodiment of the present invention.
Figure 8B:
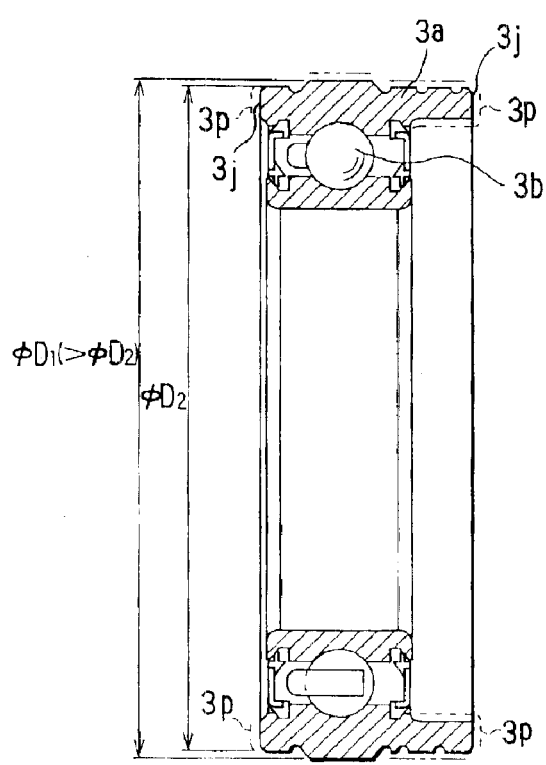
FIG. 8B is a cross-sectional view showing the radial rolling bearing according to the second embodiment.

In the second embodiment, as shown in FIGS. 8A, 8B, an outer radial dimension D1 of the outer ring 3a is defined at the position where the bearing balls 3b are disposed, and an outer radial dimension D2 of the outer ring 3a is defined at the other positions. The outer radial dimension D1 is made larger than the outer radial dimension D2, to form steps on the outer ring 3a as shown in FIGS. 8A and 8B. Therefore, the mechanical strength of the outer ring 3a can be increased, so that the bearing-ball track surface of the outer ring 3a can be prevented from being deformed due to molding pressure in the insert molding. Further, an amount of heat capable of being transmitted to the heat radiation portion 3p can be increased, thereby further improving heat radiation performance of the radial rolling bearing 3. In the second embodiment, the other parts are similar to those of the above-described first embodiment, and detail explanation thereof is omitted.

(Third Embodiment)

Figure 9:
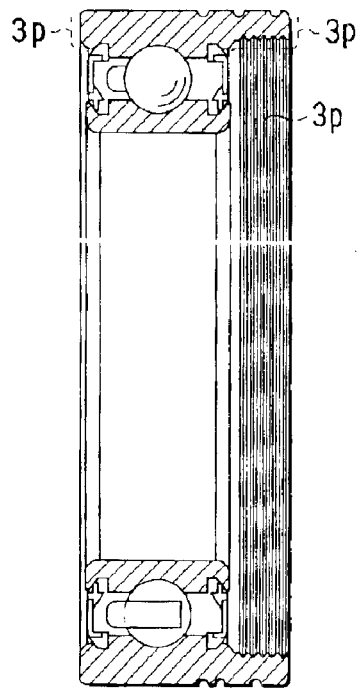
FIG. 9 is a cross-sectional view showing a radial rolling bearing according to a third embodiment of the present invention.

In the third embodiment, as shown in FIG. 9, a spiral recess portion 3q is provided on an inner peripheral surface of the heat radiation portion 3p for facilitating the heat radiation. Therefore, the heat radiation area of the heat radiation portion 3p, that is, the surface area thereof is increased. Here, the recess portion 3q can be provided in another shape such as a plural-concentric shape and a crossing-spiral shape, without being limited to the spiral shape. According to the third embodiment, by providing the recess portion 3q in the heat radiation portion 3p, the heat radiation can be effectively facilitated.

In the third embodiment, the other parts are similar to those of the above-described first embodiment, and detail explanation thereof is omitted.

(Fourth Embodiment)

Figure 10:
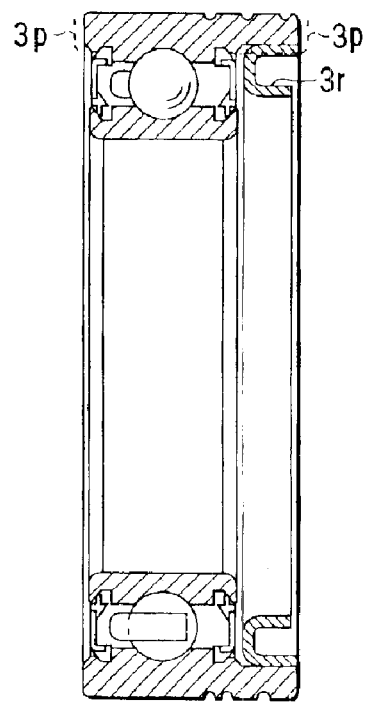
FIG. 10 is a cross-sectional view showing a radial rolling bearing according to a fourth embodiment of the present invention.

In the fourth embodiment, as shown in FIG. 10, the heat radiation area of the heat radiation portion 3p is increased by press-fitting a heat radiation fin 3r to the inner surface of the heat radiation portion 3p, so that the heat radiation can be facilitated. The heat radiation fin 3r has an approximate U-shaped cross-section, and is made of aluminum. The heat radiation fin 3r can be made of another metal such as copper without being limited to aluminum, and the cross-sectional shape of the heat radiation fin 3r can be changed to the other shape such as a L shape.

Accordingly, in the fourth embodiment, the heat radiation of the heat radiation portion 3p can be effectively increased. In the fourth embodiment, the other parts are similar to those of the above-described first embodiment, and detail explanation thereof is omitted.

(Fifth Embodiment)

Figure 11:
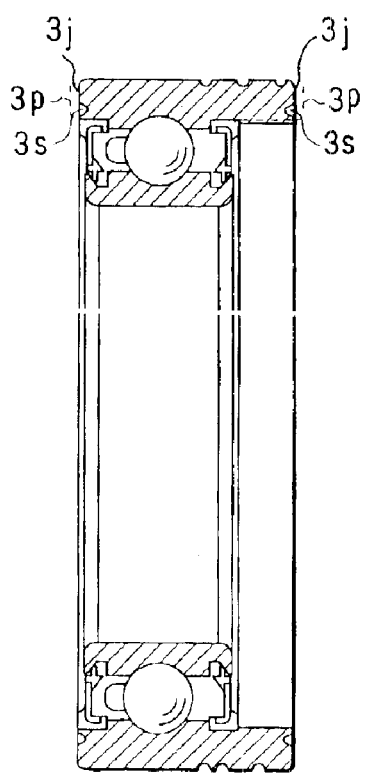
FIG. 11 is a cross-sectional view showing a radial rolling bearing according to a fifth embodiment of the present invention.

In the fifth embodiment, as shown in FIG. 11, the heat radiation area of the heat radiation portion 3p is increased by providing uneven portions 3s on the end surfaces 3j of the heat radiation portion 3p, so that the heat radiation of the heat radiation portion 3p can be facilitated. For example, the uneven portions 3s are recess portion recessed from the end surfaces 3j. Accordingly, heat radiation of the heat radiation portion 3p can be facilitated. In the fifth embodiment, the other parts are similar to those of the above-described first embodiment, and detail explanation thereof is omitted.

Although the present invention has been fully described in connection with the above-described embodiments thereof with reference to the accompanying drawings, it is to be noted that various changes and modifications will become apparent to those skilled in the art.

For example, in the above-described embodiments, the bearing including the outer and inner rings 3a, 3c is adopted as the radial rolling bearing 3. However, a shell type bearing eliminating the inner ring 3c may be adopted without being limited to the bearing 3 in the above embodiments. In the above-described embodiments, all the radial rolling bearing 3 is integrated to the pulley main body 2 by the insert molding method. However, after the outer ring 3a is integrated to the pulley main body 2 by the insert molding method, the bearing balls 3b and the inner ring 3c can be attached to the outer ring 3a integrated to the pulley main body 2.

Further, the present invention is not limited to the pulley as in the above embodiments, but can be applied to the other rotating member.

Such changes and modifications are to be understood as being within the scope of the present invention as-defined by the appended claims.

What is claimed is:

1. A rotator comprising:
    a rotating member made of resin; and
    a bearing attached to a radial inner side of the rotating member, the bearing including an outer ring integrated to the rotating member by an insert molding, an inner ring positioned at a radial inside of the outer ring, and a bearing ball that is disposed to rolling-contact an inner peripheral surface of the outer ring and an outer peripheral surface of the inner ring, wherein:
    the outer ring has an axial dimension larger than an axial dimension of the inner ring in an axial direction of the rotating member.

2. The rotator according to claim 1, wherein:
    the outer ring has an outer peripheral surface contacting the rotating member; and
    the outer peripheral surface has an uneven portion.

3. The rotator according to claim 2, wherein the uneven portion includes a plurality of recesses recessed from the outer peripheral surface to a radial inside.

4. The rotator according to claim 1, wherein the outer ring has a wall thickness larger than a wall thickness of the inner ring, in contact portions contacting the bearing ball.

5. The rotator according to claim 1, wherein:
    the rotating member includes two projections protruding to a radial inside of an outer peripheral surface of the outer ring; and
    the two projections contact two axial ends of the outer ring to pinch the outer ring from the two axial ends.

6. The rotator according to claim 1, wherein:

the outer ring has an outer peripheral surface, an axial end and a chamfer surface connecting the outer peripheral surface and the axial end; and the rotating member contacts the outer peripheral surface and the chamfer surface of the outer ring.

7. The rotator according to claim 6, wherein the chamfer surface has one of a flat shape and a curved shape.

8. The rotator according to claim 1, wherein:

the outer ring includes a heat radiation portion exposed to atmospheric air, from which heat is radiated to atmospheric air; and the heat radiation portion has a heat-radiation facilitating portion for facilitating heat radiation, the heat-radiation facilitating portion being provided to increase a heat radiation area of the heat radiation portion.

9. The rotator according to claim 8, wherein the heat-radiation facilitating portion is a plurality of recesses provided on an inner peripheral surface of the heat radiation portion.

10. The rotator according to claim 8, wherein the heat-radiation facilitating portion is a fin press-fitted to an inner peripheral surface of the heat radiation portion.

11. The rotator according to claim 8, wherein the heat-radiation facilitating portion is an uneven portion provided on an axial end of the heat radiation portion.

* * * * *